United States Patent

Masuda et al.

[11] Patent Number: 6,135,083
[45] Date of Patent: *Oct. 24, 2000

[54] DIESEL ENGINE FOR VEHICLE

[75] Inventors: Tatsuyuki Masuda; Masanori Miyamoto, both of Iwata, Japan

[73] Assignee: Yamaha Hatsudoki Kabushiki Kaisha, Iwata, Japan

[*] Notice: Under 35 U.S.C. 154(b), the term of this patent shall be extended for 296 days.

[21] Appl. No.: 08/656,919

[22] Filed: Jun. 3, 1996

[30] Foreign Application Priority Data

Jun. 5, 1995 [JP] Japan .................................... 7-137891

[51] Int. Cl.[7] .................................................... F02B 19/14
[52] U.S. Cl. .................... 123/257; 123/65 R; 123/196 R
[58] Field of Search ............................... 123/65 R, 73 R, 123/257, 196 R, 65 PE; 180/297

[56] References Cited

U.S. PATENT DOCUMENTS

| | | | |
|---|---|---|---|
| 4,787,344 | 11/1988 | Okumura et al. .................... | 123/65 PE |
| 5,005,534 | 4/1991 | Washizu ............................... | 123/184.43 |
| 5,226,399 | 7/1993 | Ozawa ............................... | 123/65 BA X |
| 5,251,584 | 10/1993 | Ohkubo .................... | 123/73 V |
| 5,257,674 | 11/1993 | Okui et al. .................... | 123/195 AC X |
| 5,360,079 | 11/1994 | Ichikawa et al. .................. | 123/73 R X |
| 5,404,792 | 4/1995 | Watanabe et al. ............... | 123/193.6 X |
| 5,501,190 | 3/1996 | Okubo et al. ........................ | 123/196 M |
| 5,511,523 | 4/1996 | Masuda ............................... | 123/196 R |

FOREIGN PATENT DOCUMENTS

| | | |
|---|---|---|
| 0636773 | 2/1995 | European Pat. Off. . |
| 6-129250 | 5/1994 | Japan .................................... 123/65 R |

*Primary Examiner*—Tony M. Argenbright
*Attorney, Agent, or Firm*—Knobbe, Martens, Olson & Bear LLP

[57] ABSTRACT

A two cycle, crankcase compression, diesel engine having a high specific output. This is achieved by using an appropriately sized and located precombustion chamber into which the fuel is injected. The porting and direction of crankshaft rotation insure against compression and combustion leakage.

20 Claims, 10 Drawing Sheets

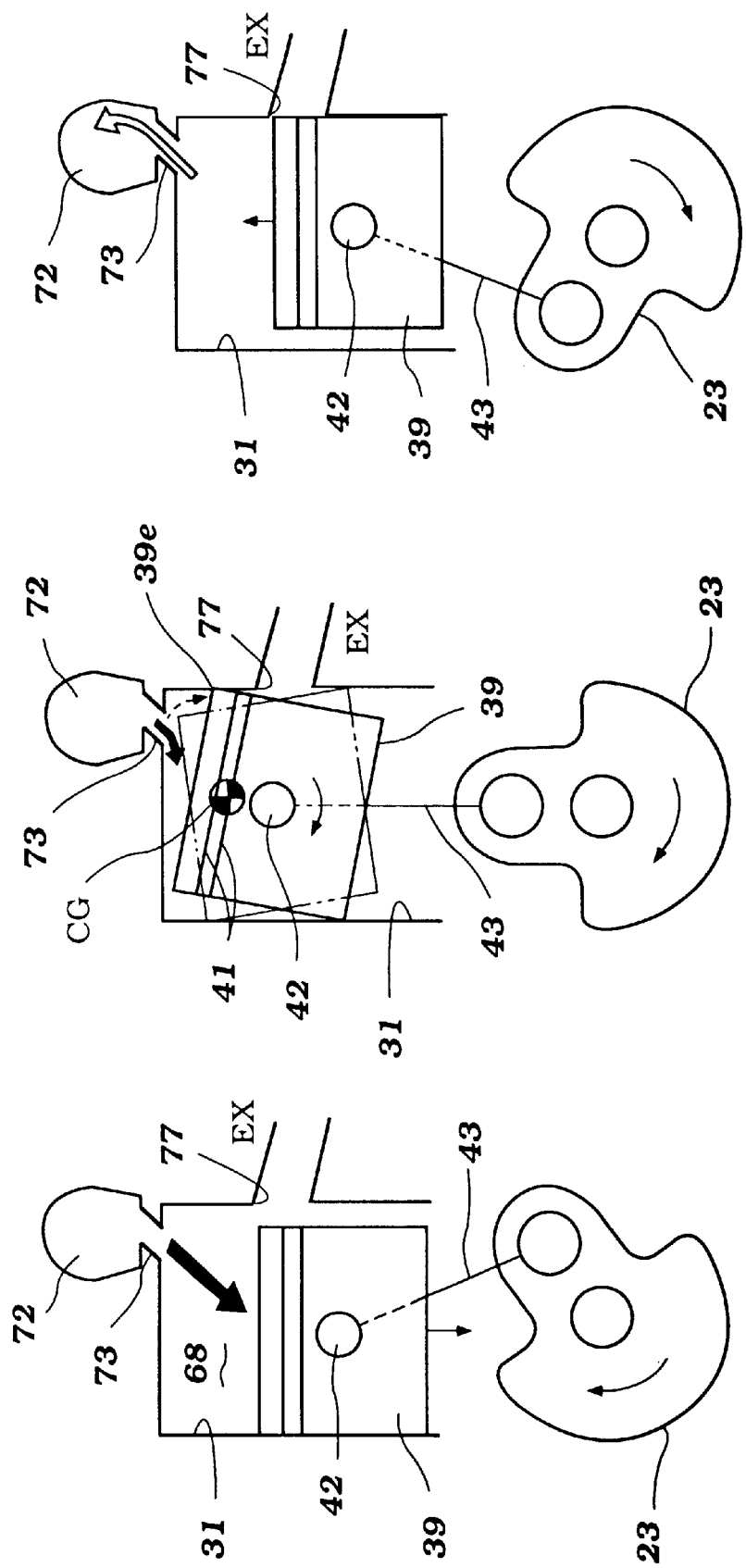

DIESEL ENGINE FOR VEHICLE

BACKGROUND OF THE INVENTION

This invention relates to a diesel engine and more particularly to a precombustion form of diesel engine that is particularly adapted for use in motor vehicles.

In many regards, diesel engines have a number of advantages over spark ignited engines. The utilization of diesel engines has, to a large part, been limited to large type vehicles such as trucks or the like. In a similar manner, in marine vehicles diesel engines are frequently as used a power plants, but again their usage is primarily with larger type watercraft.

There is, therefore, a demand for a relatively small yet high performance diesel engine that can be employed to fill the market for high efficiency, small displacement engines for vehicle application. By utilizing a small two-cycle diesel engine, it is possible to obtain relatively large power outputs for a given displacement. Hence, two-cycle diesel engines of small displacement may have considerable utility in conjunction with vehicles and particularly those of smaller sizes.

One problem that has precluded the wider utilization of diesel engines, particularly in small displacements, is the difficulty in starting and maintaining combustion in the combustion chamber. It has been proposed, therefore, to use a so-called torch or precombustion chamber which is formed generally in the cylinder head and which communicates with the main combustion chamber through a throat opening. The way this type of engine operates is that, as the piston approaches top dead center position and the charge is compressed, the charge which is transferred into the precombustion chamber will be compressed to a high degree. If the fuel for combustion is injected primarily into this precombustion chamber, it will be better assured that combustion will initiate because a stoichiometric mixture will clearly be present.

The burning fuel then expands in the precombustion or torch chamber and enters the main chamber along with additional fuel where burning can continue. Hence, this type of arrangement has considerable advantages.

It is important, however, to provide appropriate positioning of the throat area and the precombustion chambers so that the direction of flow of the burning gases and additional fuel into the combustion chamber will well mix in the combustion chamber. Also, when utilized with two-cycle engines, the direction of flow should be such that it will minimize the amount of fresh charge that can pass out of the exhaust port during or even before the time period when the exhaust port is open.

This problem is particularly acute because of the fact that the exhaust port is valved by the piston as it reciprocates in the cylinder bore. It is well known that the piston operation coupled to its connection to the connecting rod causes the piston to rock slightly in the cylinder bore. This rocking motion can open up a clearance area between the head of the piston and the cylinder bore. If the injected charge and the flow from the torch chamber can pass into this gap, it may well escape from the exhaust port and, thus, render inefficient combustion.

It is, therefore, a principal object of this invention to provide an improved diesel engine.

It is a further object of this invention to provide an improved two-cycle, crankcase compression, diesel engine applicable for utilization in a motor vehicle.

It is a still further object of this invention to provide an improved torch or precombustion chamber for diesel engines that facilitates their use with two-cycle crankcase compression engines so as to achieve high power outputs from small displacements.

SUMMARY OF THE INVENTION

The features of this invention are adapted to be embodied in a two-cycle diesel engine for use in a vehicle. The engine is comprised of a cylinder block that contains at least one cylinder bore closed at one end by a cylinder head and at the other end by a crankcase member for forming a crankcase chamber. A piston reciprocates in the cylinder bore. A crankshaft is journaled for rotation in the crankcase chamber and a connecting rod connects the piston to the crankshaft for driving the crankshaft. An exhaust port is formed in one side of the cylinder bore through which the exhaust gases may be discharged upon movement of the piston to open the exhaust port. A precombustion chamber is formed in the cylinder head on the one side of the cylinder bore and communicates with a main combustion chamber formed by the cylinder head, the cylinder bore and the piston through a throat. This throat is directed so as to discharge at a direction that extends away from the exhaust port. The relationship of the direction of the rotation of the crankshaft and the connecting rod is such that, on the expansion stroke, the piston rocks in a direction so that its head portion moves toward the exhaust port so as to mask any possible exhaust gas seepage from around the head portion toward the exhaust port.

BRIEF DESCRIPTION OF THE DRAWINGS

FIG. 9, 10 and 11 are graphical cross-sectional views showing the effect of the clearance between the piston and the cylinder bore, and showing how the arrangement is configured so as to ensure against loss of fresh charge and burning charge directly out of the exhaust port in accordance with an important feature of the invention.

DETAILED DESCRIPTION OF THE PREFERRED EMBODIMENTS OF THE INVENTION

Figure 1:
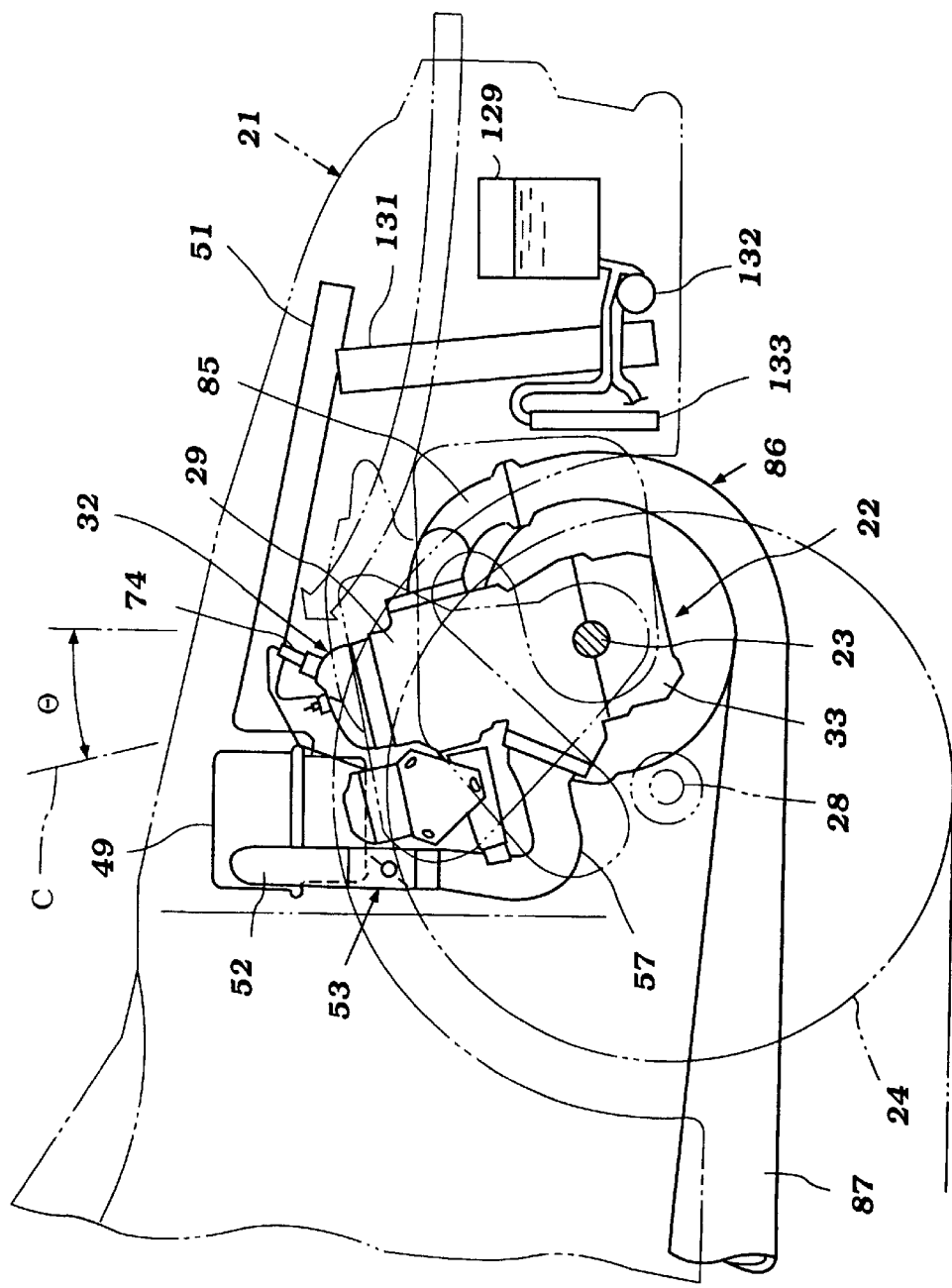
FIG. 1 is a side elevational view of the front portion of a motor vehicle, shown in phantom and powered by a two-cycle crankcase compression diesel engine constructed in accordance with an embodiment of the invention.
Figure 2:
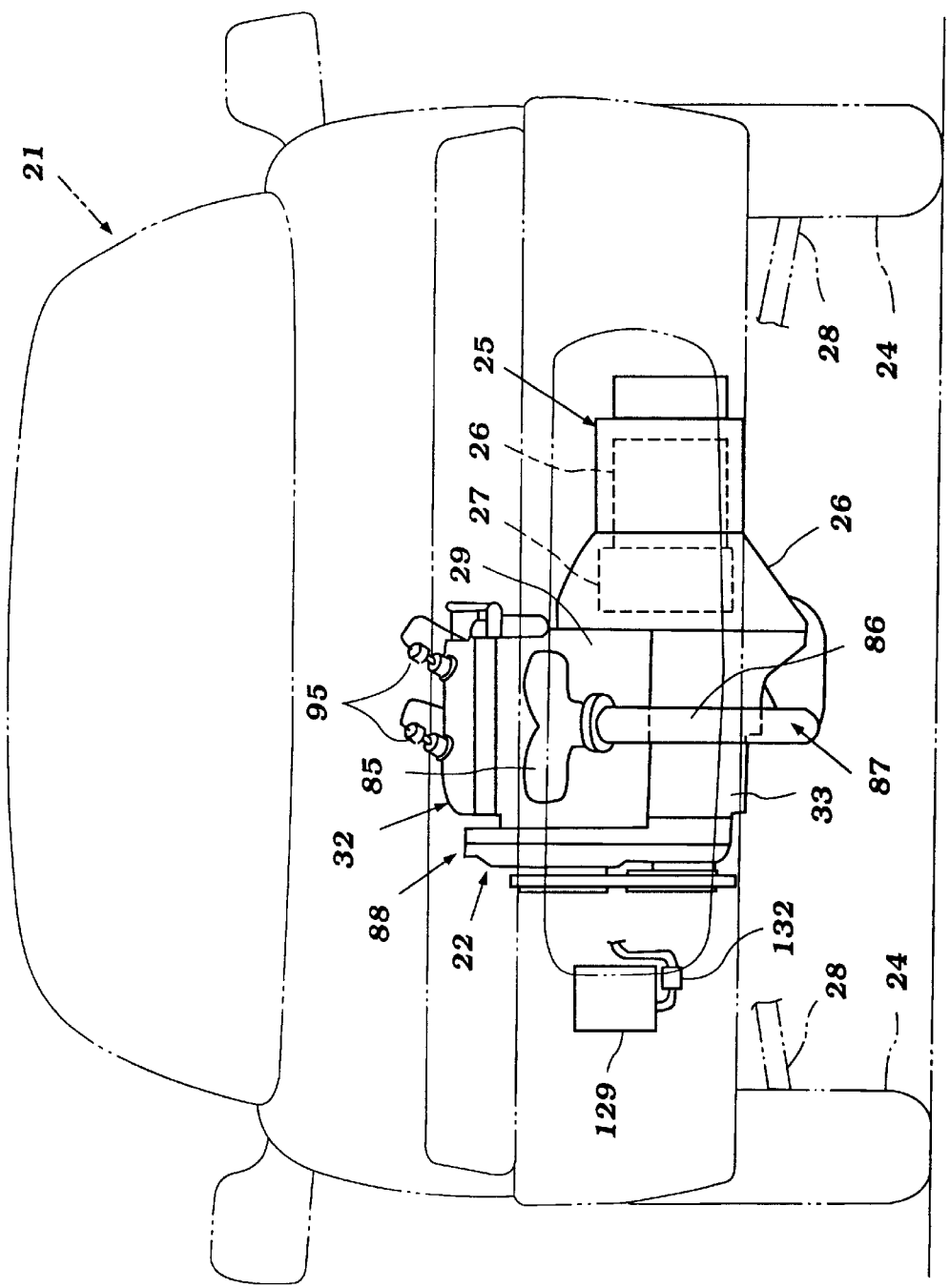
FIG. 2 is a front elevational view of the vehicle, again showing the vehicle in phantom with only the engine and associated components being shown in solid lines.
Figure 3:
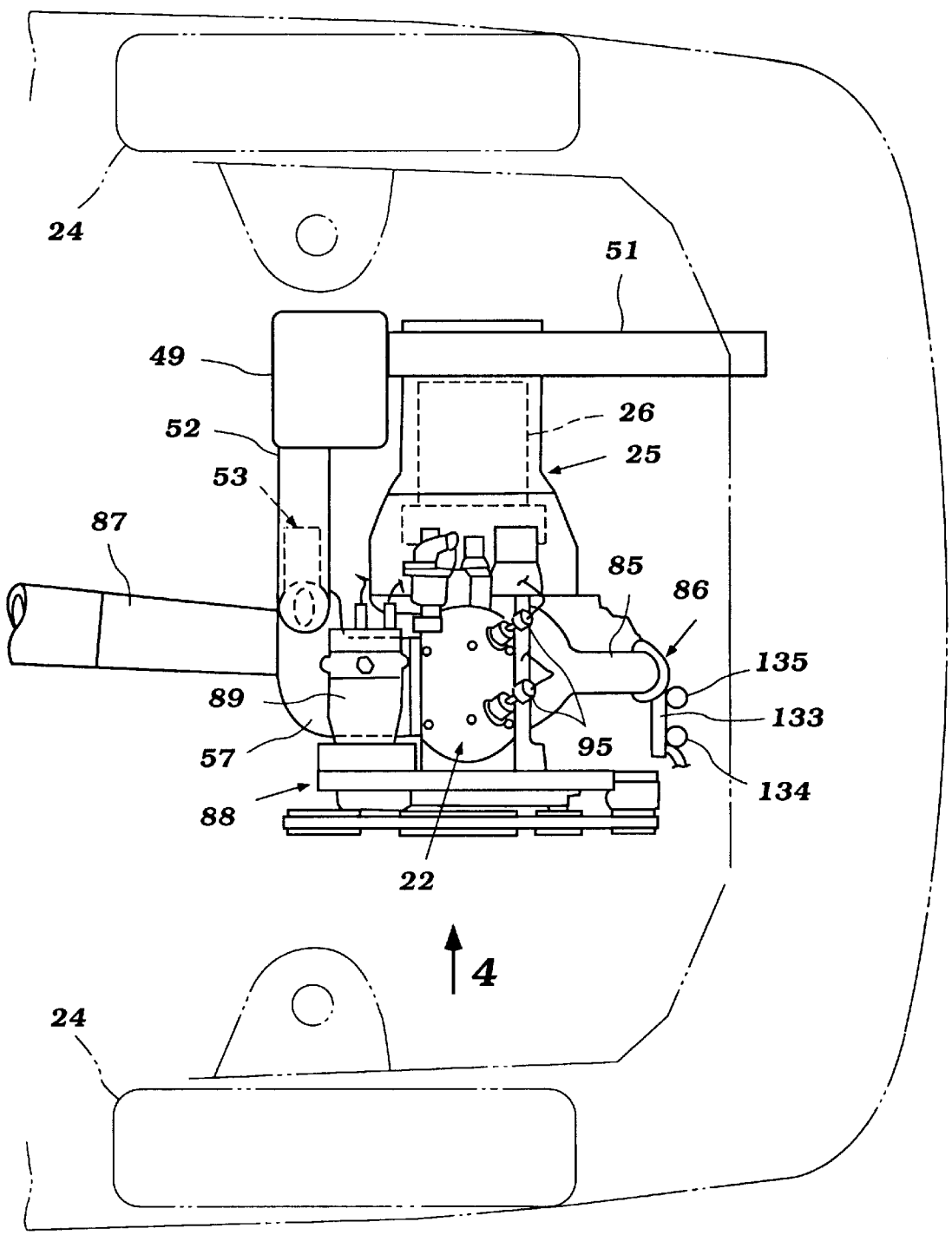
FIG. 3 is a top plan view of the front of the vehicle and, again, shows the vehicle in phantom lines with the engine and its auxiliaries shown in solid lines.

Referring first to FIGS. 1–3, a motor vehicle is shown partially and in phantom and identified generally by the reference numeral 21. The invention is described in conjunction with the application to a motor vehicle because, for the reasons aforenoted, there is a particular demand for improved high efficiency, small displacement diesel engines for use in propelling vehicles. An automobile, such as is illustrated, is a particularly advantageous utilization for such an engine. Of course the application of the invention is not so limited.

In the illustrated embodiment, the vehicle 21 is of the front engine, front wheel type and, therefore, the front of the body 21 is formed with an engine compartment in which a two-cycle, diesel engine constructed in accordance with the invention and indicated generally by the reference numeral 22 is positioned. As will become apparent, the engine 22 is supported in the engine compartment of the vehicle 21 so that its output shaft, a crankshaft indicated by the reference numeral 23 rotates about an axis that extends transversely to the longitudinal center line of the vehicle.

The engine 22 is disposed in part between the front wheels 24 of the vehicle 21. The front wheels 24 are driven through a drive assembly which is comprised of a transmission 25 which is driven off the engine 22 at one end by a flywheel or clutch contained within a clutch housing 26. A transfer drive then transfers drive from the transmission 25 to a final drive 26 and differential 27 for driving a pair of axle shafts 28 which drive the front wheels 24 in a well known manner.

Having this general description of the environment, the engine 22 will now be described in more detail. This description will primarily center, at least initially, on FIGS. 4–7. FIGS. 1–3 will be referred to again later in combination with FIG. 12 in order to describe certain of the engine auxiliaries and accessories.

In the illustrated embodiment, the engine 22 is of the two-cylinder in-line type. It will be apparent, however, to those skilled in the art how the invention may be applied in conjunction with engines having other cylinder numbers and other cylinder configurations. However, for certain reasons which will be described, the invention has particular utility in conjunction with in-line engines and, particularly, those that are canted slightly from the vertical, as will also be described in more detail by reference to the noted figures.

The engine 22 is comprised of a cylinder block 29 which may be formed from a suitable material and has a number of cylinder bores 31 which is, of course, dependent upon the number of cylinders in the engine. These cylinder bores 31 are disposed so that their axes lie on a plane that is on a line C (FIG. 1) which also forms the plane about which FIG. 6 is taken. This plane C lies at a slight acute angle θ to a vertically extending plane. This relationship also appears in FIG. 5, and a horizontal plane H is also depicted in this view so as to permit understanding of the orientation. In the illustrated embodiment, the angle θ is such that the engine cylinder block 29 is inclined rearwardly toward the passenger compartment and away from the front of the vehicle 21. In some instances, an opposite inclination may be desirable.

At their upper ends, the cylinder bores 31 are closed by a cylinder head assembly 32 which is of a built-up construction as will be described. The cylinder head assembly 32 is affixed to the cylinder block 29 in a suitable manner. The opposite ends of the cylinder bores 31 are closed by means that includes a crankcase member, indicated generally by the reference numeral 33 which is also affixed to the cylinder block 29 in a suitable manner.

This crankcase member 33 and the skirt 34 of the cylinder block 29 form a plurality of crankcase chambers 35 which contain the crankshaft 28. As may be seen best in FIG. 6, the crankshaft 28 is rotatably journaled in these crankcase chambers 35 by means that include a front main bearing 36, a rear main bearing 37 and an intermediate main bearing 38. The front main bearing 36 is depicted as being of the ball type, while the rear and intermediate main bearings 37 and 38 are depicted as being of needle or roller bearing type. Obviously, other types of bearing arrangements may be employed if desired.

Pistons 39 are supported for reciprocation in each of the cylinder bores 31. These pistons have head portions which are formed with ring grooves that receive at least a pair of piston rings 41 for serving compression and oil control purposes, as is well known in the art. These head portions are also formed with the piston pin bosses that receives piston pins 42. The piston pins 42 provide a pivotal connection to the small ends of connecting rods 43. Needle-type bearings may be interposed in this connection to reduce friction. These bearings are indicated at 44. The big ends of the connecting rods 43 are journalled on throws 45 of the crankshaft 23. Needle bearings 46 are provided at these journals.

As is typical with two-cycle crankcase compression engine practice, the crankcase chambers 35 associated with each of the cylinder bores 31 is sealed from the others and this sealing mechanism includes seals shown at 47. An air intake charge is delivered to the crankcase chambers 35 by means of an induction system, indicated generally by the reference numeral 48. In this embodiment, the induction system 48 includes an air inlet device which appears best in FIGS. 1 and 3. This includes a filter body 49 which is mounted at the rear side of the engine 22 and in proximity to the transmission 25, but to the rear of it. An air inlet tube 51 extends forwardly from this air filter box toward the front end of the engine in the engine compartment of the motor vehicle 21 so as to receive ram inlet air. The filter box 49 includes in addition to a filter device (not shown) a mechanism for silencing the intake air charge.

Air is delivered from the filter box 49 downstream of the filter element to an intake pipe 52 which, in turn, serves a throttle body assembly, indicated generally by the reference numeral 53. Referring now again primarily to FIGS. 5–7, the throttle body 53 includes a throttle valve 54 that is mounted on a throttle valve shaft 55. This throttle valve shaft 55 is controlled by a servomotor 56 in a manner which will be described. The throttle valve 54, rather than serving the primary purpose of controlling the engine speed as with a spark ignited engine, acts to control the scavenging flow of air in the engine, in a manner which will be described.

The throttle body 53 serves an intake manifold 57 which has outlet branches 58 each of which communicate with a respective intake port 59 formed in the skirt 34 of the cylinder block 29. As is typical with two-cycle engine practice, a reed-type valve assembly 61 is provided in each intake port 59. These reed-type valves 61 permit air to flow into the crankcase chambers 35 when the pistons 39 are moving upwardly in the respective cylinder bores 31. However, when the pistons 39 move downwardly, the reed-type check valves 61 will close to preclude reverse flow, as is well known in this art.

Figure 7:
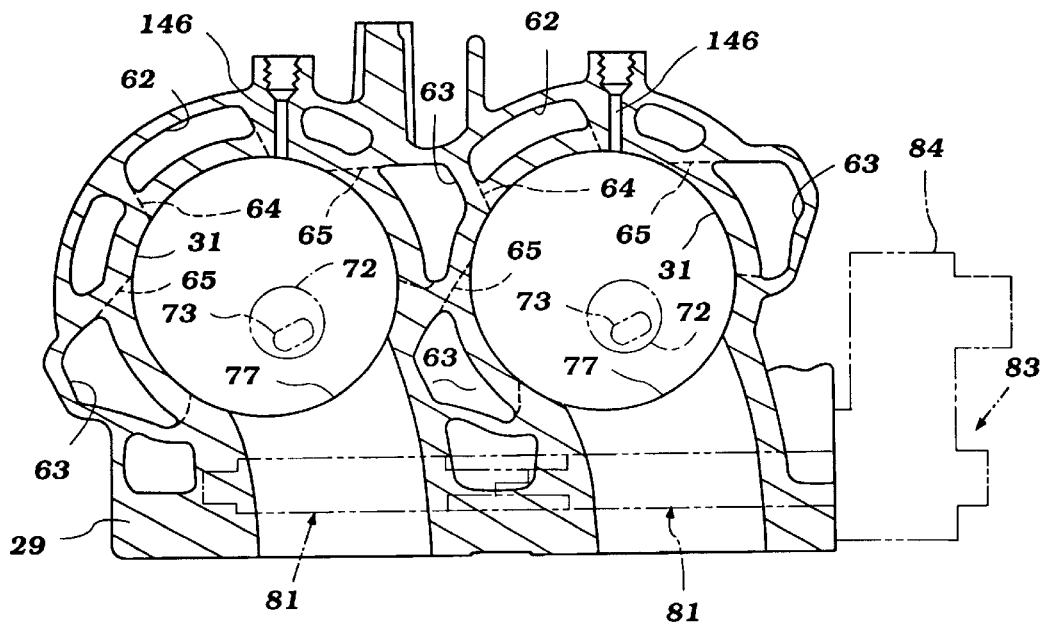
FIG. 7 is an enlarged cross-sectional view taken along the line 7—7 of FIG. 5.

The charge which is compressed in the crankcase chambers 35 is transferred to the area above the head of the piston 39 through a scavenging system which includes a center scavenge passage 62 and a pair of side scavenge passages 63. As will be noted by reference to FIG. 7, the scavenge passages 62 and 63 are rotated slightly in a counter-clockwise direction as shown in FIG. 7 so that the side scavenge passages 63 between adjacent cylinder bores 31 are staggered relative to each other. This provides clearance between the adjacent side scavenge passages 63 so that the engine 22 may be made shorter or more compact in its length.

The respective scavenge passages 62 and 63 open into the cylinder bore 31 through respective scavenge ports 64 and 65. As will become apparent, this configuration for the scavenging system provides a Schnurl-type scavenging.

Figure 5:
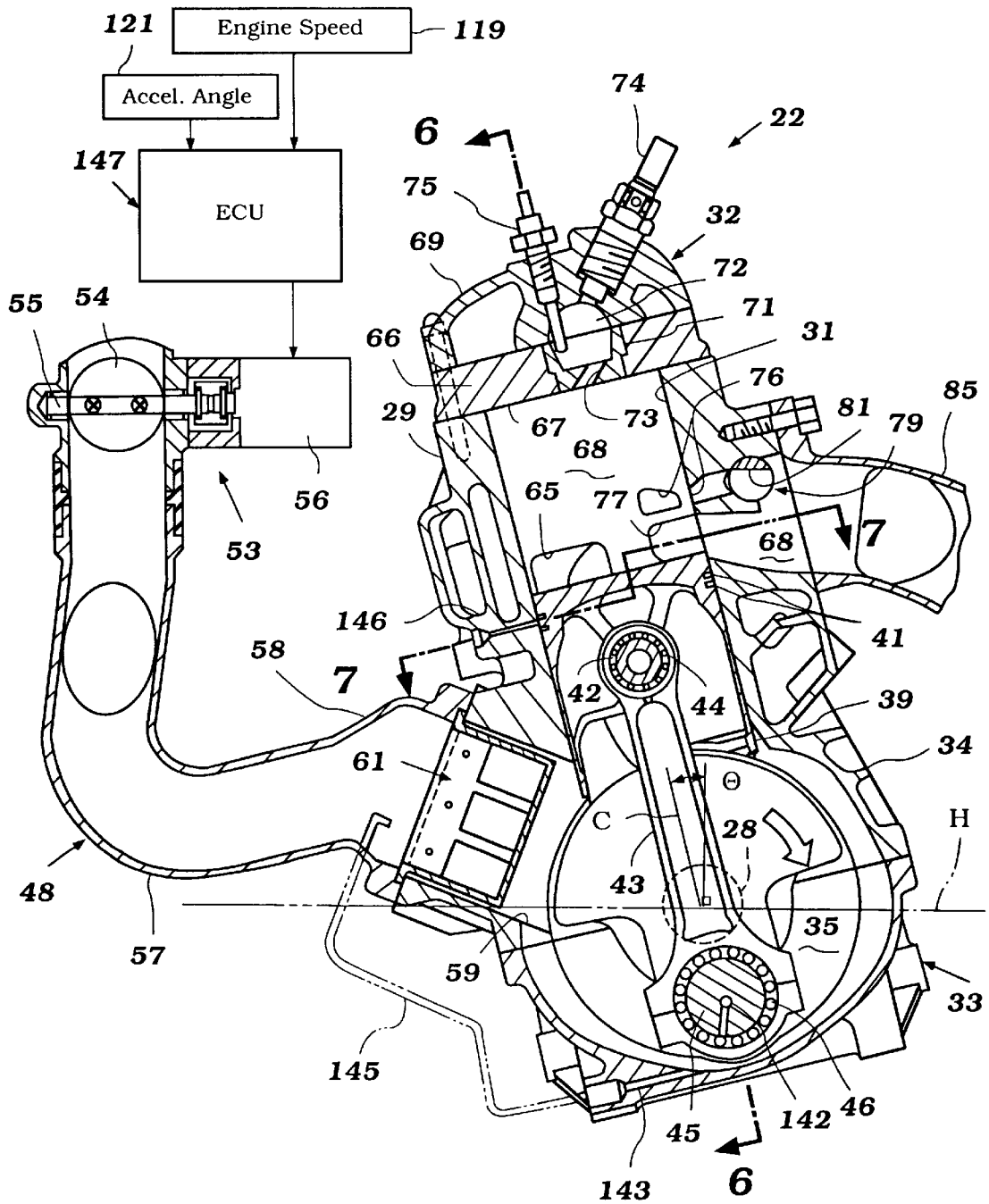
FIG. 5 is a cross-sectional view taken along a plane parallel to the plane of FIG. 4 and through one of the cylinder bores.
Figure 6:
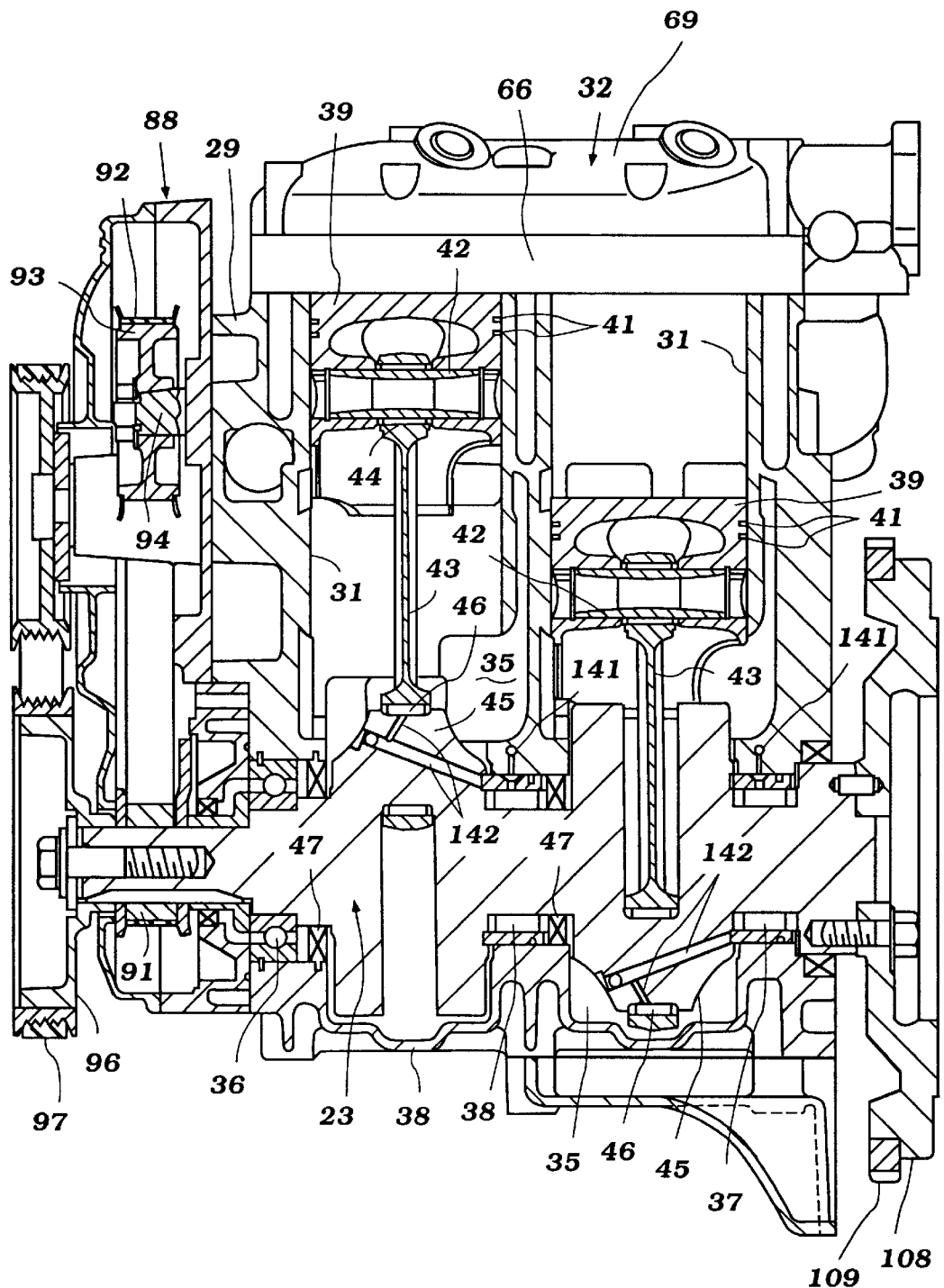
FIG. 6 is an enlarged cross-sectional view taken along the line 6—6 of FIG. 5.

Referring now primarily to FIG. 5, the construction of the cylinder head assembly 32 will be described. As has been noted, the cylinder head assembly 32 is a multi-part assembly made up primarily of a lower cylinder head plate 66 which has a generally planer lower surface 67. This surface forms a closure for the upper end of the cylinder bores 31 and defines with them and the head of the piston, a main combustion chamber volume 68. This main combustion chamber volume 68 varies cyclicly in displacement, but at the bottom dead center position of the piston 39 as shown in FIG. 5, this volume is a maximum.

The remaining main component of the cylinder head assembly 32 is a further cylinder head member 69 which is fixed to the member 66 and cylinder block 29 as aforedescribed. The cylinder head member 66 receives an insert piece 71 and the cylinder head member 69 has a recess which cooperates with this insert piece to define an auxiliary pre-combustion or torch combustion chamber 72.

As may be seen in FIG. 7, these chambers 72 are offset from the cylinder bore axis C away from the center scavenge passage 22 and toward an exhaust port arrangement, which will be described shortly. This precombustion or torch chamber 72 communicates with the main combustion chamber 68 through a throat area 73. It should be noted that the throat area 73 is disposed at an angle so that the charge which exits the precombustion chamber 72 into the main combustion chamber 68 will be directed primarily toward the center scavenge port 64, although the outer termination of the throat 73 is disposed substantially at the center of the head of the piston 39 when the piston 39 is at its top dead center position. The purpose of this construction will also be described later.

A fuel injector, indicated by the reference numeral 74, is mounted in the cylinder head assembly 32 and sprays into the precombustion or torch chamber 72. The fuel injector 74 is disposed so that it will spray toward one side of the precombustion chamber 72.

As is well know in the diesel art, when the pistons 39 move upwardly in the main combustion chamber 68, the air charge will be compressed in this chamber and the increased pressure transmitted through the throat 73 to the prechamber 72. At an appropriate time, the injector 74 injects fuel which, upon contacting the high pressure, high temperature compressed charge in the prechamber 72 will ignite and expand. This expansion causes a flame torch to issue from the throat 73 into the main chamber 68 along with the continued injected fuel so as to burn in both the prechamber 72 and in the main chamber 68.

In order to assist in initiating combustion under low temperature conditions, a glow plug 75 may be mounted in the cylinder head assembly and has its heating tip exposed in the pre- or torch chamber 72.

As the burning gases continue to burn and expand, the pistons 39 will be moved downwardly to cross first an upper auxiliary exhaust port 76 and finally a lower main exhaust port 77. The exhaust ports 76 and 77 communicate with an exhaust passage arrangement 78 formed in the cylinder block 29.

An exhaust control valve, indicated generally by the reference numeral 79 and having a construction of the type generally known is mounted for rotation in the cylinder block 29. The exhaust control valve 79 has a generally cylindrical portion 81 with a cutout valving area 82 in registry with the auxiliary ports 76. A servomotor mechanism, indicated generally by the reference numeral 83 (FIG. 7) drives the exhaust control valves 81 through a gear train 84. The control strategy is such that, by opening and closing the exhaust control valve 79, it is possible to change the effective compression ratio of the engine. This permits the use of a high compression ratio under low and mid range performance so as to improve the torque and power outputs under this running condition. However, the compression ratio is lowered when the engine speed and load become high, by opening the exhaust control valve 79. This avoids overheating and knocking in the engine under this extreme running conditions.

Referring now primarily to FIGS. 2 and 3 in addition to FIG. 5, it will be seen that an exhaust manifold 85 is mounted on the front of the cylinder block 29 and cooperates with the cylinder block exhaust passages 78 so as to collect the exhaust gases. The manifold 85 extends forwardly and downwardly for connection to an exhaust pipe 86 which, in turn, turns rearwardly and runs below the lower portion of the engine 22 and communicates and appropriate exhaust system 87 for the engine which may include a muffler and/or catalytic converter. The exhaust gases are then discharged to the atmosphere in a known manner.

A timing case 88 is disposed at the front of the engine or, as installed in the vehicle 21, at one side. This timing case includes a drive for a high pressure fuel pump, indicated generally by the reference numeral 89 which supplies fuel to the fuel injectors 74. As seen best in FIG. 6, a sprocket 91 is affixed to the nose end of the crankshaft 23. This sprocket drives a toothed belt 92 which, in turn, drives a driven sprocket 93. This driven sprocket 93 is coupled to a pump drive shaft 94 of the high pressure fuel pump 89. Fuel is delivered from the high pressure fuel pump 89 to the injectors 74 through conduits having couplings 95 at their ends which cooperate with the injectors 74 in a known manner.

In addition to the timing drive 88 for driving the high pressure fuel pump 89, a number of other engine accessories and auxiliaries are driven off this end of the crankshaft 23. Therefore, the crankshaft 23 is provided with a drive pulley 96 that is mounted forwardly of the timing case 88 and which drives a serpentine drive belt 97. This drive belt 97 drives a number accessories, such as an air conditioning compressor 98 via its drive pulley 99.

In addition, an alternator 101 is disposed above the air conditioning compressor 98 and is driven by the belt 97 through its respective drive sprocket 102. A water pump assembly 103 circulates coolant through the cooling jackets of the engine 22. This coolant pump has a drive shaft with a drive sprocket 104 which is also driven by the belt 97. Finally, a power steering pump 105 has a drive shaft driven by a drive pulley 106 for operating a power steering system for the vehicle 21.

An idler pulley 107 is mounted on the timing case 88 adjacent the alternator 101 and ensures that the drive belt 97 will be maintained in substantial frictional engagement with all of the pulleys which it drives as aforenoted.

An important feature of the engine 22 deals with the direction of rotation of the crankshaft 23 and its interrelationship to the positioning of the exhaust ports 76 and 77. This relationship will now be described with particular reference to FIGS. 9–11. In these figures, the diametral clearance between the piston 39 and the cylinder bore 31 is greatly exaggerated so as to permit a better understanding of the invention. Although the clearance is exaggerated in the drawings, even the small clearance which does exist is quite significant in the affect of sealing and the efficiency of the engine.

As may be seen in FIG. 9, the engine crankshaft 23 rotates in a clockwise direction and, when the piston 39 is moving downwardly, particularly at the end of the expansion and beginning of the scavenge portions, the forces acting on the piston 39, in addition to having a downwardly component indicated by the arrow, have a sidewardly directed component which causes the piston 39 to shift and slide toward the side of the cylinder bore 31 opposite to the exhaust port 77. Since this is on the exhaust cycle, it forms no particular problem.

However, as the piston 39 moves toward its top dead center position and when the charge in the main combustion chamber 68 is being compressed, because of the direction of rotation and the fact that the center of gravity CG of the piston 39 is above the piston pin 42, the piston will tend to rock so that its upper edge 39e will cock toward the side of the cylinder bore 31 where the exhaust port 77 is formed. As a result, the charge which is issuing from the torch chamber as shown by the dark arrow in these figures will be directed primarily away from the exhaust port 77. If the rocking movement were in the opposite direction, then the piston 39 would cock as shown in the phantom line view and open up a gap through which the freshly introduced burning charge could escape and seriously and adversely affect the engine performance. Thus, because of the construction in accordance with the invention, this condition will not occur.

As the piston 39 moves upwardly on its compression stroke, the forces acting through the connecting rod 43 will tend to move the piston to the right as seen in FIG. 11 so as to further improve the sealing with the exhaust port 77 and permit the charge to be transferred easily into the precombustion chamber 72 through the throat 73.

While continuing to refer to FIG. 6, it will be seen that the end of the crankshaft 23 opposite to that having the drive sprockets 91 and drive pulley 96, is provided with a flywheel 108 which forms a portion of the aforenoted clutch assembly 27 which drives the transmission 26. A starter gear 109 is affixed to this flywheel 108 and is driven by an electric starter motor (not shown) for starting of the engine 22 in a known manner.

Figure 4:
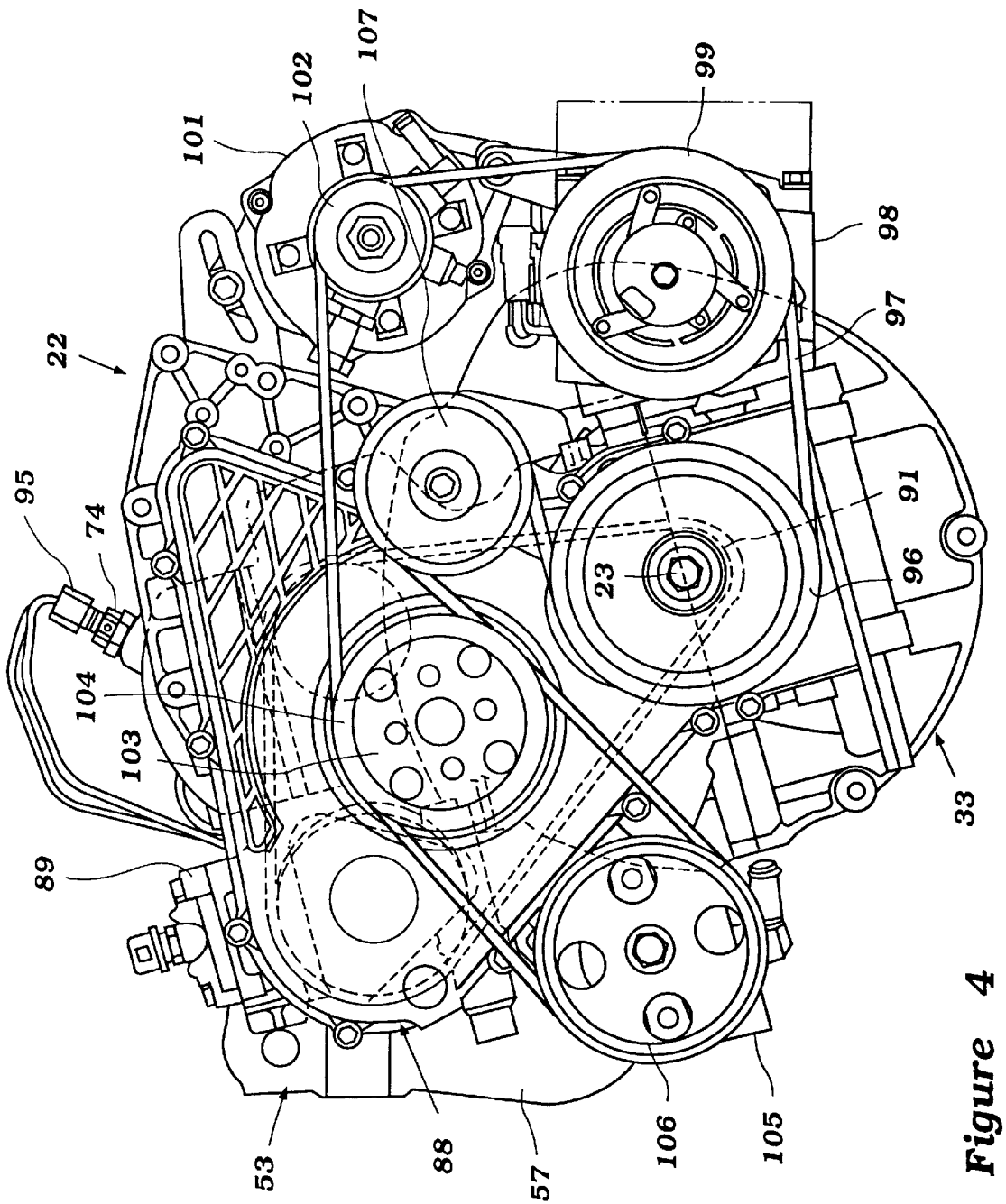
FIG. 4 is an enlarged front elevational view of the engine looking in the direction of the arrow 4 in FIG. 3.
Figure 12:
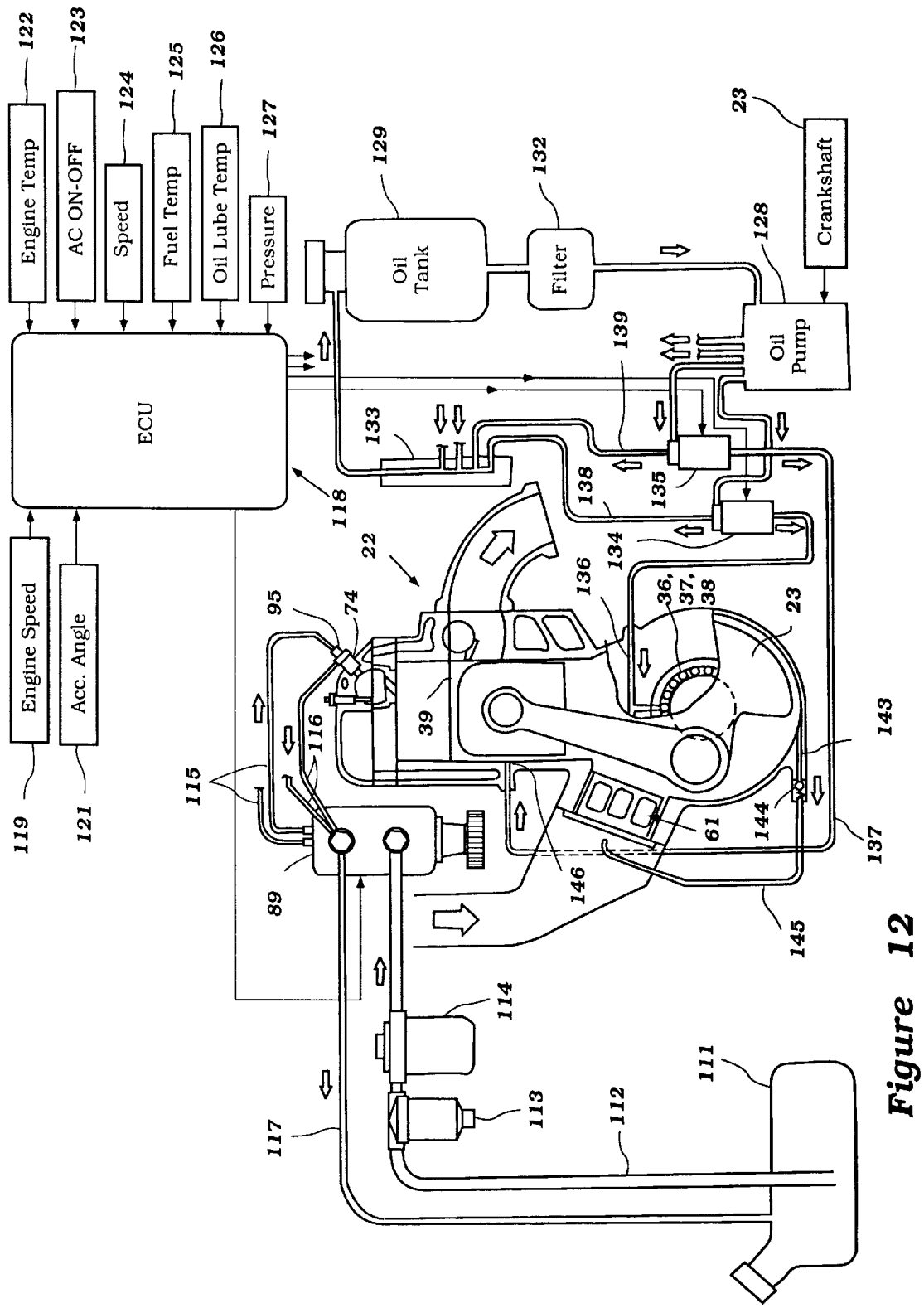
FIG. 12 is a partially schematic view showing the components of the engine and the engine related auxiliaries.

The lubricating system for the engine 22 will now be described by principal reference to FIGS. 4–6 and to FIG. 12. This latter figure shows the engine 22 schematically, but shows in more detail and in somewhat schematic fashion, certain auxiliaries for those components of the engine that have already been described. Before describing the lubricating system, however, the remainder of the fuel supply system will be described by reference to this figure utilizing certain of the reference numerals that have already been utilized to describe components that have been introduced through the preceding description.

In this figure, it will be seen that the fuel supply system for supplying fuel to the fuel injectors 74 includes a remotely positioned fuel tank 111 that is located at an appropriate position in the vehicle 21. Fuel is drawn from the tank 111 by the fuel injection pump 89 previously described through a conduit 112. A water separator 113 and fuel filter 114 are positioned in this line. As noted, the pump 89 delivers fuel to the injector 74 through supply conduits terminating in the aforenoted connectors 95. These supply conduits appear in this figure and are identified by the reference numeral 115.

In addition, a fuel rail and/or fuel pressure regulator (not shown) is provided adjacent the injectors 74. The fuel pressure is maintained by returning fuel back through return conduits 116 and 117 to the fuel tank 11.

The basic components of the lubricating system will be described by reference to FIG. 12. Although various types of lubricating systems can be employed, the illustrated embodiment includes an arrangement there are two basic oil supplies to the engine. The first oil supply supplies lubricant under pressure to the crankshaft and connecting rods, while the other lubricant supply delivers lubricant through the cylinder bore to the sliding surfaces of the piston 39 and cylinder bore 31.

The actual delivery to the engine will be described later by reference to FIGS. 4–6, but the system will be described first generally by reference to FIG. 12. In addition to these positive lubricant supplies, the system also employs a drain arrangement wherein lubricant that collects in the crankcase chambers 35 will be collected and delivered to the induction system upstream of the reed-type valves 61 for circulation within the crankcase chamber and on the underside of the pistons 39.

The entire lubrication system is controlled by an ECU, indicated generally by the reference numeral 118. This ECU can be programmed with any of a wide variety of types of strategies and the condition sensed which will be described should be considered as only exemplary of those that can be utilized in conjunction with the invention. Those skilled in the art will readily understand how other supply and control systems can be utilized.

The ECU receives the following signals from appropriate sensors for determining the proper amount of lubrication for the various components of the engine:

| | |
|---|---|
| 119 | Engine speed |
| 121 | Operator accelerator control position |
| 122 | Engine coolant temperature |
| 123 | Operation or non-operation of the air condition compressor 98 |
| 124 | Speed of the vehicle 21 |
| 125 | Temperature of the fuel |
| 126 | Lubricating oil temperature |
| 127 | Atmospheric air pressure |

As noted, the ECU 118 operates on a desired control strategy using the noted or other signals to control the delivery of lubricant to the engine through the aforenoted supply systems. The ECU 118 controls, among other things, a main oil pump, indicated generally by the reference numeral 128. This main oil pump may be driven off of the engine directly from one or more of the aforenoted engine shafts or pulley arrangements. Those skilled in the art will readily understand how this can be accomplished and the drive has been shown only schematically in FIG. 12.

The oil pump 128 draws lubricant from a main oil tank 129. In the actual vehicle as shown in FIG. 1, the main oil tank 129 may be disposed forwardly of the heat exchanger 131 or radiator for the main engine cooling system. The oil pump draws the oil from the oil tank 129 through a filter 132 which is located in the vehicle in a convenient place for its servicing. A portion of the oil pumped by the oil pump 128 is also passed through an oil radiator 133 that is disposed to one side of the cooling system heat exchanger or radiator 131. This oil is bypassed directly back to the oil tank 129 so as to maintain the desired oil temperature.

The oil pump 128, in addition to recirculating a percentage of the oil, also delivers oil to two, three-way solenoid control valves, indicated generally by the reference numerals 134 and 135. These control valves 134 and 135 are operated by the ECU in a desired strategy so as to control the flow of oil through two main supply conduits 136 and 137, respectively. The amount of oil delivered is controlled by controlling either the flow from the valves 134 and 135 to the supply conduits 136 and 137, respectively, or for bypassing oil back to the tank 129 through return conduits 138 and 139, respectively. These return conduits also pass oil through the oil cooler 133 to maintain the desired oil temperature.

The conduit 136 lubricates primarily the crankshaft 23 and its bearings. The conduit 137 delivers lubricant directly to the pistons 39 for their lubrication. These supply conduits will now be described by primary reference to FIGS. 5 and 6 with the crankshaft journal oil supply arrangement being described first by reference to FIG. 6.

The oil supply line 136 feeds a main gallery formed in the cylinder block 29 and which has a plurality of supply passages 141, each of which is juxtaposed to a respective one of the rear main bearing 37 and the intermediate main bearing 38. The front main bearing 136 may also be so lubricated, although this bearing may receive lubricant from another source if desired.

In addition to supplying lubricant to the main bearings 37 and 38, the supply conduits 141 also communicate with cross-drillings 142 formed in the respective crankshaft throws 45 which, in turn, deliver oil to the bit end bearings 46 of the connecting rods 43. Any lubricant which flows in excess will be collected in the crankcase chambers 35 and returned to the induction system through a drain conduit 143 (FIGS 5 and 12).

This drain conduit 143 has interposed in it a check valve 144 so as to permit oil to flow from the crankcase chambers 35 through a conduit 145 back into the intake manifold 57 upstream of the reed-type check valve 61. The oil thus flowing will act to silence the operation of the reed-type valves. In addition, this oil will be returned back into the circulation system so as to lubricate the underside of the piston 39 and also the connecting rod small end bearing 44 and piston pin 42.

The lubrication of the pistons 39 and, specifically, their skirts by the oil supplied through the conduit 137 will now be described by primary reference to FIGS. 5, 7 and 12. The conduit 137 supplies oil to individual ports 146 formed in the side of the cylinder block 29 opposite to the exhaust ports 76 and 77. The supply ports 146 are disposed so that they intersect the cylinder bore 31 at a point which is aligned with approximately the area between the piston rings 41 when the piston 39 is in its bottom dead center position as shown in FIG. 5. When the pistons 39 are at their top dead positions, the ports 146 still register with the lower portion of the piston skirts and, hence, the sliding surfaces of the piston and cylinder bore 31 will be well lubricated.

Figure 8:
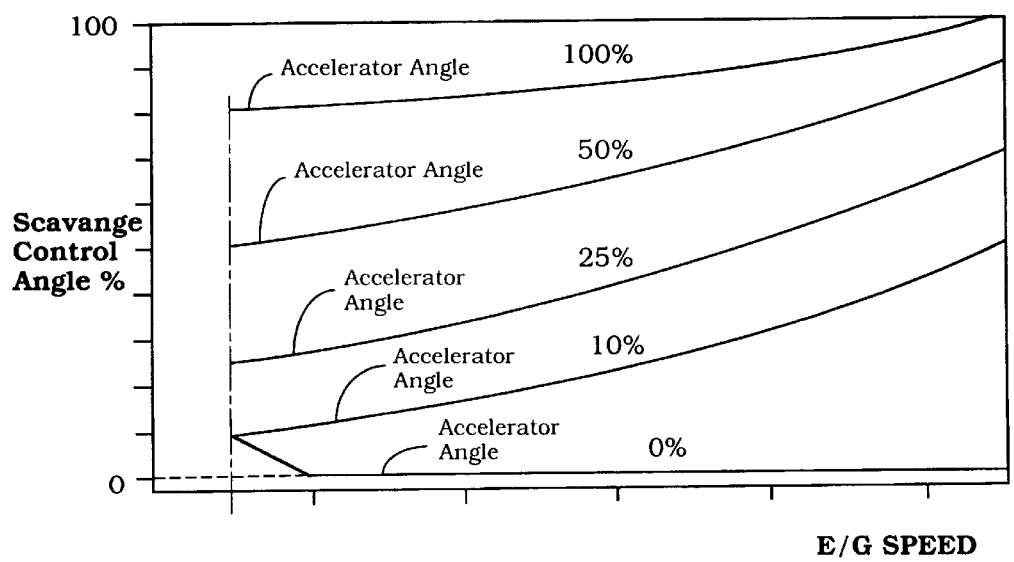
FIG. 8 is a graphical view showing the map which indicates the position of setting of scavenge controlling throttle valve in response to the parameters of engine speed and operator power demand.

Referring now to FIGS. 5 and 8, the strategy by which the scavenge controlling throttle valve 54 is controlled will be described. As previously noted, the throttle valve 54 is not designed to control the engine speed, but rather controls the amount of scavenging of the engine. Therefore, the valve 54 and its actuating servomotor 56 is controlled by an ECU, indicated generally by the reference numeral 47. The control strategy is such that the scavenge control throttle valve 54 is positioned at a position that is dependent upon engine speed and engine load.

Engine speed signal is provided by a sensor such as the sensor 119 previously noted and which outputs its signal to the lubricant control ECU 118. It should be understood that the functions of ECU 118 and that of the ECU 147 can actually be performed by a single central processing unit. Alternatively, separate controls may be provided.

Engine load is determined by the operator accelerator angle which also is sensed by a sensor such as the sensor 121 previously referred to. The ECU 147 is programmed with a map like that shown in FIG. 8 so as to determine the angular positioning of the control valve 54 in response to engine speed and engine load.

The map of FIG. 8 contains a number of speed and accelerator angle curves, only the curves for the accelerator angles of zero (idle), 10%, 25% 50% and full throttle (100%) are shown. From this map, the percentage opening of the scavenge control valve is determined by the ECU 147 and the servomotor 56 is appropriately positioned so as to control the amount of scavenging flow so as to obtain optimum engine performance for the given engine speed and load conditions.

Figure 13:
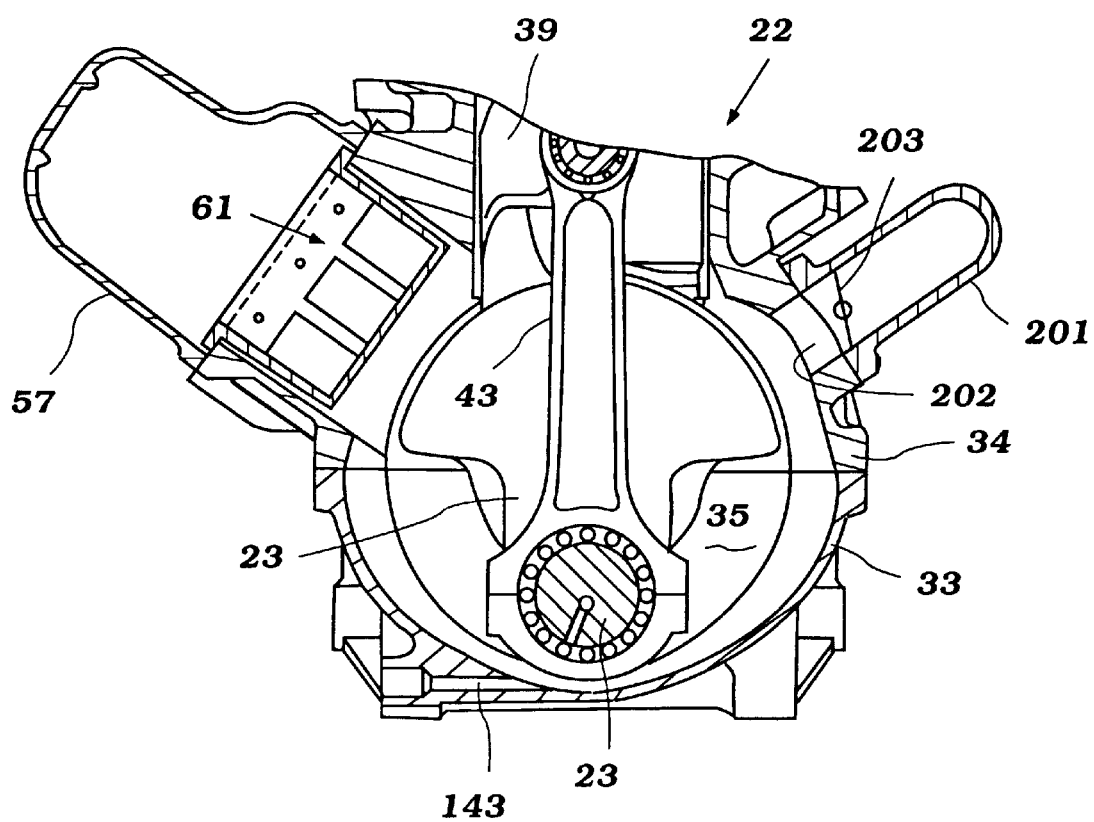
FIG. 13 is a partial cross-sectional view, in part similar to FIG. 5, and shows another arrangement for controlling the amount of scavenging air flow.

FIG. 13 shows another embodiment of the invention and this embodiment differs from the previously described embodiment only in the way in which the amount of scavenging air flow is controlled. In this embodiment, a throttle valve is not provided in the induction system and, hence, the throttle scavenging control valve 54 is deleted from the induction system. Aside from this, the construction is the same and, thus, only a single view corresponding to a portion of FIG. 5 is necessary to understand this embodiment of the invention.

In this embodiment, the scavenge control system comprises a scavenge control manifold, indicated generally by the reference numeral 201 which communicates with each of the crankcase chambers 35 through a respectively scavenge control port 202. Scavenge control throttle valves 203 are positioned in branch sections of the manifold 201 and, by opening and closing these valves 203, the individual crankcase chambers 35 may be communicated with each other to a controlled extent. By controlling the amount of this communication, the actual scavenging control can be accomplished and this strategy will be the same as that previously described.

Thus, from the foregoing description, it should be readily apparent to those skilled in the art that the invention is very effective in providing a good torch chamber arrangement for a two-cycle crankcase compression diesel engine wherein the torch chamber is associated with the main chamber and piston and direction of crankshaft rotation so as to minimize the blow-by of combustion products directly from the torch chamber into the exhaust ports. Of course, the foregoing description is that of a preferred embodiment of the invention, and various changes and modifications may be made without departing from the spirit and scope of the invention, as defined by the appended claims.

What is claimed is:

1. A two-cycle diesel engine for a vehicle, said engine being comprised of a cylinder block containing at least one cylinder bore closed at one end by a cylinder head and at the other end by a crankcase member for forming a crankcase chamber, a piston reciprocating in said cylinder bore, a crankshaft journaled in said crankcase chamber, a connecting rod connecting said piston to said crankshaft for driving said crankshaft, an exhaust port formed in one side of said cylinder bore and valved by the reciprocation of said piston, and a precombustion chamber formed in said cylinder head on said one side of said cylinder bore and communicating with a main combustion chamber formed by said cylinder head, said cylinder bore and said piston through a throat directed away from said exhaust port, the direction of rotation of said crankshaft being such that said piston tends to rotate about its connection with said connecting rod in a direction during the expansion stroke for moving the upper edge of said piston into engagement with the side of said cylinder bore where said exhaust port is formed.

2. A two-cycle diesel engine as set forth in claim 1, further including scavenge port means formed in the cylinder bore on the side of the cylinder bore facing the exhaust port.

3. A two-cycle diesel engine as set forth in claim 2, wherein the engine is supported in the vehicle so that the axis of rotation of the crankshaft extends transversely to the longitudinal direction of the vehicle.

4. A two-cycle diesel engine as set forth in claim 3, wherein the engine is supported in the vehicle so that the exhaust port extends in a forward direction in the vehicle.

5. A two-cycle diesel engine as set forth in claim 3, wherein the engine is supported in the vehicle so that the scavenge port means extends generally in a rearward direction in the vehicle.

6. A two-cycle diesel engine as set forth in claim 5, wherein the engine is supported in the vehicle so that the exhaust port extends in a forward direction in the vehicle.

7. A two-cycle diesel engine as set forth in claim 3, wherein the engine is supported in the vehicle so that the cylinder bore axis is inclined to a vertically extending plane containing the axis of rotation of the crankshaft.

8. A two-cycle diesel engine as set forth in claim 7, wherein the engine is supported in the vehicle so that the exhaust port extends in a forward direction in the vehicle.

9. A two-cycle diesel engine as set forth in claim 7, wherein the engine is supported in the vehicle so that the scavenge port means extends generally in a rearward direction in the vehicle.

10. A two-cycle diesel engine as set forth in claim 9, wherein the engine is supported in the vehicle so that the exhaust port extends in a forward direction in the vehicle.

11. A two-cycle diesel engine as set forth in claim 7, wherein the engine inclination of the cylinder bore is in a rearward direction in the vehicle.

12. A two-cycle diesel engine as set forth in claim 11, wherein the engine is supported in the vehicle so that the exhaust port extends in a forward direction in the vehicle.

13. A two-cycle diesel engine as set forth in claim 11, wherein the engine is supported in the vehicle so that the scavenge port means extends generally in a rearward direction toward the vehicle.

14. A two-cycle diesel engine as set forth in claim 13, wherein the engine is supported in the vehicle so that the exhaust port extends in a forward direction in the vehicle.

15. A two-cycle diesel engine as set forth in claim 7, further including a lubricating system for delivering lubricant under pressure to certain portions of the engine for its lubrication, said lubricating system comprising an oil pump and a lubricant tank for supplying lubricant to the oil pump.

16. A two-cycle diesel engine as set forth in claim 15, wherein the lubricant pump and the oil tank is disposed on the front of the engine.

17. A two-cycle diesel engine as set forth in claim 16, wherein the lubricant pump delivers lubricant to the crankshaft for its lubrication.

18. A two-cycle diesel engine as set forth in claim 16, wherein the lubricant pump delivers lubricant directly to the piston through the cylinder bore for lubrication for the sliding surfaces of the piston and the cylinder bore.

19. A two-cycle diesel engine as set forth in claim 18, wherein the lubricant pump delivers lubricant to the crankshaft for its lubrication.

20. A two-cycle diesel engine as set forth in claim 19, further including means for sensing engine conditions and varying the amount of lubricant supplied to the engine depending upon the sensed engine running conditions.

* * * * *